(12) United States Patent
Okuda

(10) Patent No.: US 11,809,357 B2
(45) Date of Patent: Nov. 7, 2023

(54) COMMUNICATION SYSTEM, SUPERIOR CONTROL DEVICE AND SUBORDINATE CONTROL DEVICE

(71) Applicant: YAZAKI CORPORATION, Tokyo (JP)

(72) Inventor: Sadaharu Okuda, Makinohara (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 17/837,034

(22) Filed: Jun. 10, 2022

(65) Prior Publication Data

US 2022/0398209 A1  Dec. 15, 2022

(30) Foreign Application Priority Data

Jun. 11, 2021  (JP) .................................. 2021-098245

(51) Int. Cl.
*G06F 13/40* (2006.01)
*H04L 12/40* (2006.01)

(52) U.S. Cl.
CPC .......... *G06F 13/4027* (2013.01); *H04L 12/40* (2013.01)

(58) Field of Classification Search
CPC ............................ G06F 13/4027; H04L 12/40
See application file for complete search history.

(56) References Cited

U.S. PATENT DOCUMENTS

| 2009/0177874 | A1* | 7/2009 | Terashima | .......... G06F 9/30058 712/E9.016 |
| 2012/0117288 | A1* | 5/2012 | Katogi | .................. G06F 13/364 710/114 |
| 2014/0108848 | A1* | 4/2014 | Okada | ...................... G06F 1/08 713/501 |
| 2018/0307635 | A1* | 10/2018 | Rota | ...................... G06F 13/20 |

(Continued)

FOREIGN PATENT DOCUMENTS

| JP | 2002-254996 A | 9/2002 |
| JP | 2002-261780 A | 9/2002 |

(Continued)

OTHER PUBLICATIONS

Translation for WO2021020211A1 (Year: 2021).*

*Primary Examiner* — Henry Tsai
*Assistant Examiner* — John B Roche
(74) *Attorney, Agent, or Firm* — KENEALY VAIDYA LLP

(57) ABSTRACT

A communication system includes a central, zone ECUs capable of communicating with the central ECU via a communication bus, and zone ECUs capable of communicating with the central ECU via a communication bus. The central ECU periodically transmits, to the communication buses, a count signal including a count value counted up every time the count signal is transmitted, transmits a control signal including a start count value and control content to the communication buses, and sets a transmission priority of the count signal to be higher than a transmission priority of the (Continued)

control signal. The zone ECUs receive the count signal and the control signal, after the control signal is received, when the count value included in the received count signal becomes equal to the start count value included in the control signal, an operation corresponding to the control content included in the control signal is started.

5 Claims, 4 Drawing Sheets

(56) References Cited

U.S. PATENT DOCUMENTS

2020/0186386 A1* 6/2020 Hartwich ............... H04J 3/0697
2022/0274523 A1* 9/2022 Kurokawa ............ H04L 12/413

FOREIGN PATENT DOCUMENTS

| JP | 2011-216085 A | 10/2011 | |
|---|---|---|---|
| JP | 2020-205573 A | 12/2020 | |
| JP | 2021-86232 A | 6/2021 | |
| WO | 2021/020211 A1 | 2/2021 | |
| WO | WO-2021020211 A1 * | 2/2021 | ............... B60Q 1/38 |

* cited by examiner

COMMUNICATION SYSTEM, SUPERIOR CONTROL DEVICE AND SUBORDINATE CONTROL DEVICE

CROSS-REFERENCE TO RELATED APPLICATIONS

This application is based on and claims priority under 35 USC 119 from Japanese Patent Application No. 2021-098245 filed on Jun. 11, 2021, the contents of which are incorporated herein by reference.

TECHNICAL FIELD

The present invention relates to a communication system, a superior control device and a subordinate control device.

BACKGROUND ART

In recent years, it has been studied that zone ECUs control electrical devices in an area according to an instruction of a central ECU by communication between the central E CU (superior control device) and the zone ECUs (subordinate control device) disposed in each area of a vehicle.

In related art, as a communication method between ECUs mounted on a vehicle, a CAN or a CAN-FD of a passive communication method that does not use a repeater (gateway or the like) is used (Patent Literatures 1 and 2). In the above-described CAN or CAN-FD of the passive communication method, in order to secure a normal communication transmission path, the number of devices connected to buses and a transmission path length are limited. Therefore, when the above-described CAN or CAN-FD is adopted for communication between the central ECU and the plurality of zone ECUs scattered in each area of the vehicle, it is difficult to connect the central ECU and all the zone ECUs by one bus.

Therefore, for example, it is considered that a left-side bus disposed on a left side of the vehicle and a right-side bus disposed on a right side are provided, the central ECU and the zone ECUs disposed on the left side of the vehicle are connected by the left-side bus, and the central ECU and the zone ECUs disposed on the right side of the vehicle are connected by the right-side bus. In addition, it is considered that a front-side bus disposed on a front side of the vehicle and a rear-side bus disposed on a rear side of the vehicle are provided, the central ECU and the zone ECUs disposed on the front side of the vehicle are connected by the front-side bus, and the central ECU and the zone ECUs disposed on the rear side of the vehicle are connected by the rear-side bus.

The zone ECU operates according to a control signal transmitted from the central ECU via the bus, but when the bus is in a high load state, the control signal stands by and a transmission delay occurs. Therefore, when the buses are provided on the front and rear sides or the left and right sides, there is a problem that an operation timing deviates due to deviation in a transmission timing of the control signals between the zone ECUs of the different buses. Therefore, lighting of front and rear turn lamps and left and right turn lamps may vary, and control timings of front and rear brake actuators may deviate.

CITATION LIST

Patent Literature

Patent Literature 1: JP-2002-261780-A
Patent Literature 2: JP-2002-254996-A

SUMMARY OF INVENTION

The present invention has been made in view of the above circumstances, and an object of the present invention is to provide a communication system capable of preventing a variation in an operation start timing between subordinate control devices to which different buses are connected, a superior control device, and a subordinate control device.

In order to achieve the above object, a communication system, a superior control device, and a subordinate control device according to the present invention are characterized as follow.

A communication system according to the present invention includes superior control device; a first subordinate control device capable of communicating with the superior control device via a first bus, and a second subordinate control device capable of communicating with the superior control device via a second bus. The superior control device includes a first transmission unit that periodically transmits a count signal including a count value counted up every time the count signal is transmitted to the first bus and the second bus, and a second transmission unit that transmits a control signal including a start count value and control content to the first bus and the second bus. A transmission priority of the count signal is set to be higher than a transmission priority of the control signal. The first subordinate control device and the second subordinate control device include a first reception unit that receives the count signal, and a second reception unit that receives the control signal. After the control signal is received, when the count value included in the received count signal becomes equal to the start count value included in the control signal, an operation corresponding to the control content included in the control signal is started.

In addition, a superior control device according to the present invention is capable of communicating with a first subordinate control device via a first bus and capable of communicating with a second subordinate control device via a second bus. The superior control device includes a first transmission unit that periodically transmits a count signal including a count value counted up every time the count signal is transmitted to the first bus and the second bus, and a second transmission unit that transmits a control signal including a start count value and control content to the first bus and the second bus. A transmission priority of the count signal is set to be higher than a transmission priority of the control signal.

A subordinate control device according to the present invention is capable of communicating with a superior control device. The subordinate control device includes a first reception unit that receives a count signal including a count value counted up every time the count signal is transmitted from the superior control device, and a second reception unit that receives a control signal including a start count value and control content transmitted from the superior control device. After the control signal is received, when the count value included in the received count signal becomes equal to the start count value included in the control signal, an operation corresponding to the control content included in the control signal is started.

The present invention has been briefly described above. Further, details of the present invention will be clarified by reading an aspect (hereinafter, referred to as an "embodiment") for implementing the invention to be described below with reference to the accompanying drawings.

DESCRIPTION OF EMBODIMENTS

A specific embodiment according to the present invention will be described below with reference to the accompanying drawings.

Figure 1:
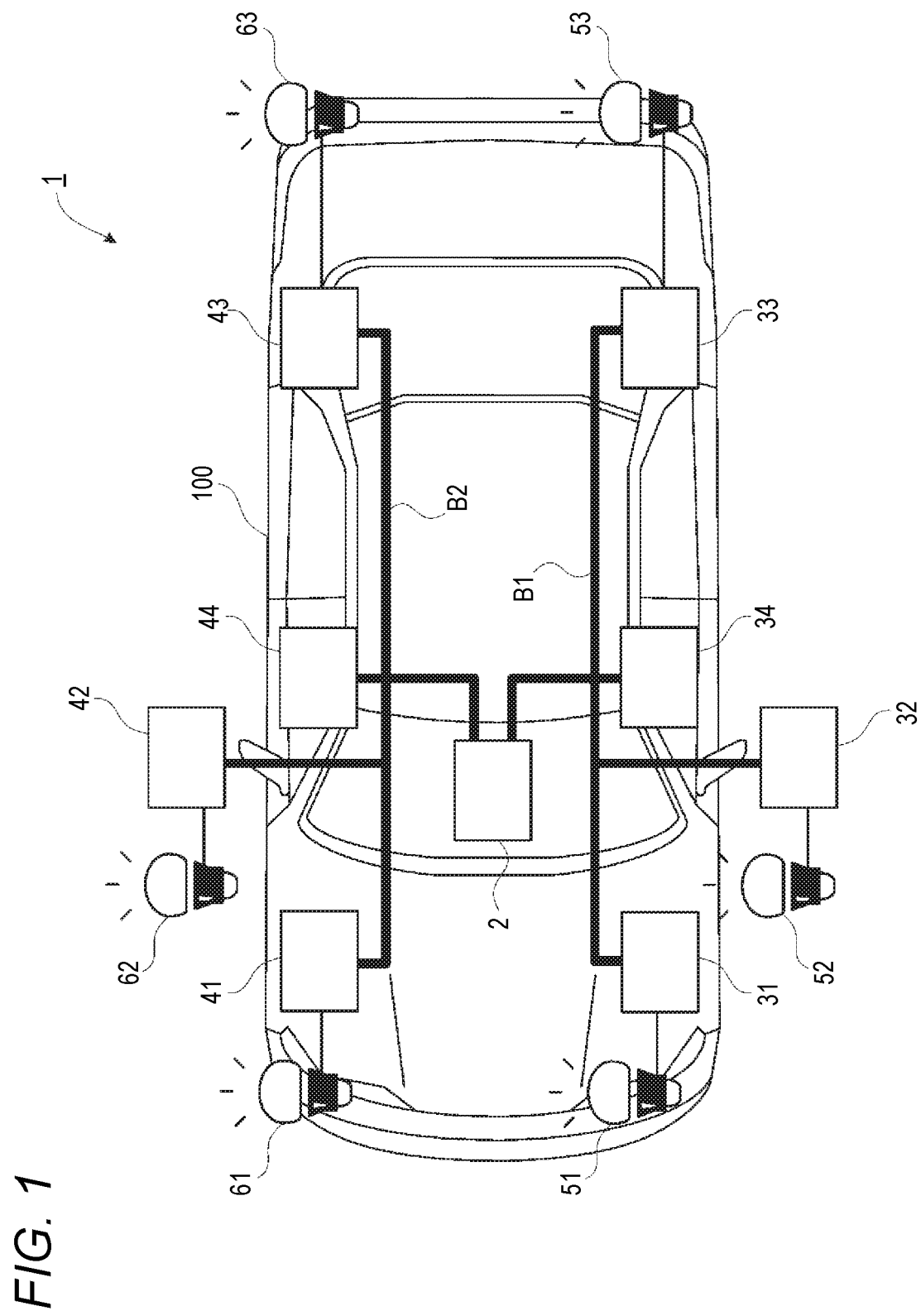
FIG. 1 is a block diagram showing an embodiment of a communication system according to the present invention.

FIG. 1 is a block diagram showing an embodiment of a communication system 1 according to the present invention. The communication system 1 according to the present embodiment is mounted on a vehicle 100. The communication system 1 includes a plurality of communication buses B1 (first bus), communication buses B2 (second bus), a central ECU 2 (superior control device), a plurality of zone ECUs 31 to 34 (first subordinate control device), and a plurality of zone ECUs 41 to 44 (second subordinate control device).

The plurality of communication buses B1, B2 are connected between, for example, the central ECU 2 disposed in an instrument panel of the vehicle 100 and the zone ECUs 31 to 34 and 41 to 44 disposed in respective areas of the vehicle 100. In the present embodiment, the communication buses B1 are connected between the central ECU 2 and the plurality of zone ECUs 31 to 34 disposed in a left area of the vehicle 100. The communication buses B2 are connected between the central ECU 2 and the plurality of zone ECUs 41 to 44 disposed in a right area of the vehicle 100.

In the present embodiment, an example in which the communication buses B1, B2 are provided corresponding to the left and right areas will be described, but the present invention is not limited thereto. The communication buses B1, B2 may be provided corresponding to the respective areas of the vehicle 100. For example, the vehicle 100 may be divided into a front area and a rear area, the central ECU 2 and the zone ECUs 31 to 34 disposed in the front area may be connected by the communication buses B1 corresponding to the front area, and the central ECU 2 and the zone ECUs 41 to 44 disposed in the rear area may be connected by the communication buses B2 corresponding to the rear area.

The central ECU 2 includes a microcomputer having a CPU, and controls the entire communication system 1.

The plurality of zone ECUs 31 to 34 are disposed in the left area of the vehicle 100. The plurality of zone ECUs 41 to 44 are disposed in the right area of the vehicle 100. In the present embodiment, the zone ECUs 31, 41 are disposed on a front side of the vehicle 100, the zone ECUs 32, 34, 42, 44 are disposed near doors on a driver's seat side of the vehicle 100, and the zone ECUs 33, 43 are disposed on a rear side of the vehicle 100.

The zone ECUs 31 to 34 and 41 to 44 communicate with the central ECU 2 and control lamps 51 to 53 and 61 to 63 disposed in the respective areas depending on control signals transmitted from the central ECU 2. The lamps 51 to 53 are disposed in the left area of the vehicle 100. The lamps 61 to 63 are disposed in the right area of the vehicle 100. The lamps 51, 61 are disposed in parallel in the left and right on the front side of the vehicle 100, and are turned on and off at the same time. The lamps 52, 62 are disposed on left and right side mirrors, respectively, and are turned on and off at the same time. The lamps 53, 63 are disposed in parallel in the left and right on the rear side of the vehicle 100, and are turned on and off at the same time.

The lamps 51 to 53 are connected to and controlled by the zone ECUs 31 to 33, respectively. The lamps 61 to 63 are connected to and controlled by the zone ECUs 41 to 43, respectively. In the example shown in FIG. 1, the zone ECUs 31 to 33 and 41 to 43 are also connected with powertrain-system electrical devices and chassis-system electrical devices in addition to the lamps 51 to 53 and 61 to 63.

The communication system 1 according to the present embodiment employs a multi-master system in which equal bus access can be implemented in the central ECU 2 and the zone ECUs 31 to 34 and 41 to 44. In the multi-master system, the central ECU 2 and the zone ECUs 31 to 34 and 41 to 44 determine whether other ECUs are performing signal transmission to the communication buses B1, B2 based on voltage levels of the communication buses B1, B2. When other ECUs are not performing the signal transmission, the central ECU 2 and the zone ECUs 31 to 34 and 41 to 44 transmit signals, and when other ECUs are performing the signal transmission, the central ECU 2 and the zone ECUs 31 to 34 and 41 to 44 wait until the signal transmission is completed and transmit the signals.

In addition, the communication system 1 according to the present embodiment employs CSMA/CA (Carrier Sense Multiplex Access with Collision Avoidance) in order for the plurality of ECUs 2, 31 to 34, and 41 to 44 to simultaneously transmit the signals to the communication buses B1, B2, thereby preventing the signals from colliding with each other. In the CSMA/CA, the ECUs 2, 31 to 34, and 41 to 44 assign an ID indicating a transmission priority to a signal to be transmitted. The ECUs 2, 31 to 34, and 41 to 44 stop the signal transmission based on the voltage levels of the communication buses B1, B2 when a signal assigned with an ID having a higher transmission priority than those of the ECUs 2, 31 to 34, and 41 to 44 is simultaneously transmitted. As a result, a signal to which an ID having a high transmission priority is assigned is preferentially transmitted to the communication buses B1, B2.

Figure 3:
FIG. 3 is a table showing signals transmitted by a central ECU shown in FIG. 1 and IDs assigned to the signals.

More specifically, the ECUs 2, 31 to 34, and 41 to 44 transmit signals including "0: dominant (superiority)" and "1: recessive (inferiority)". In the communication buses B1, B2, when the signals including "0" and "1" are simultaneously transmitted, a signal level corresponds to "0". Therefore, as shown in FIG. 3, an ID with all bits "0" is an ID having a highest priority, and an ID with all bits "1" is an ID having a lowest transmission priority. For example, when the ID with all bits "1" and the ID with all bits "0" are simultaneously transmitted, the ID with all bits "0" is preferentially transmitted in the communication buses B1, B2. When a signal transmitted in the ID transmission does not match the signal level of the communication buses B1, B2, the ECUs 2, 31 to 34, and 41 to 44 determine that a signal assigned with an ID having a higher transmission priority than those of the ECUs 2, 31 to 34, and 41 to 44 is simultaneously transmitted, and stop the signal transmission.

Figure 2A:
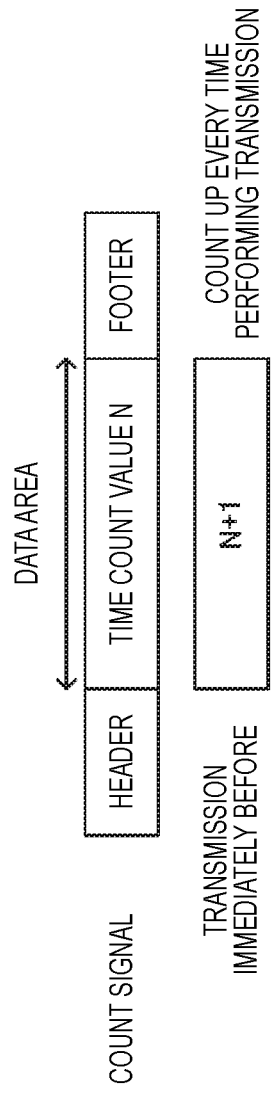
FIG. 2A is a diagram showing a frame configuration of a count signal.
Figure 2B:
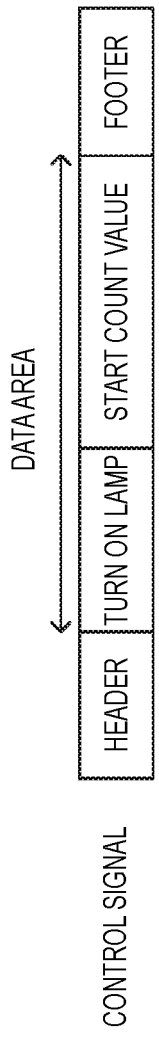
FIG. 2B is a diagram showing a frame configuration of a control signal.

Next, a signal transmitted by the central ECU 2 will be described. The central ECU 2 functions as a first transmission unit and periodically transmits count signals to the communication buses B1, B2. A frame configuration of the count signal will be described with reference to FIG. 2A. As shown in FIG. 2A, the count signal includes a header, a data area, and a footer, and a time count value is included in the data area. The central ECU 2 counts up the time count value every time the central ECU 2 transmits the count signal. The header of the count signal includes the ID indicating the transmission priority. In the present embodiment, as shown in FIG. 3, the ID with all bits "0" that has the highest priority is assigned as an ID of the count signal.

In addition, the central ECU 2 functions as a second transmission unit, and transmits control signals for controlling the zone ECUs 31 to 34 and 41 to 44. Among the control signals, for example, a lamp control signal that is output to the zone ECUs 31 to 34 and 41 to 44 which are connected to the communication buses B1, B2 different from each other and need to operate at the same time includes a header, a data area, and a footer, and control content (turn on the lamp) and a start count value are included in the data region. The header of the lamp control signal includes the ID indicating the transmission priority. In the present embodiment, as shown in FIG. 3, an ID of the lamp control signal is assigned with an ID having a lower transmission priority than those of powertrain related control signals for controlling the powertrain-system electrical devices and chassis-system related control signals for controlling the chassis-system electrical devices. The central ECU 2 transmits the lamp control signal to both of the communication buses B1, B2.

The central ECU 2 cause the control signal to include a start count value having a shorter difference from the time count value included in the count signal transmitted immediately before as the transmission priority of the ID included in the control signal is higher. Specifically, when the time count value transmitted immediately before is 100, 105 is included as the start count value in the powertrain related control signal having a high transmission priority, and 110 is included as the start count value in the lamp control signal having a low transmission priority. As a result, the control content included in the control signal including the ID having the high transmission priority can be quickly executed.

On the other hand, the zone ECUs 31 to 33 and 41 to 43 connected to the lamps 51 to 53 and 61 to 63 function as a first reception unit and a second reception unit, and receive the count signal and the lamp control signal. After the zone ECUs 31 to 33 and 41 to 43 receive the lamp control signal, when the count value included in the received count signal becomes equal to the start count value included in the control signal, the zone ECUs 31 to 33 and 41 to 43 turn on the lamps 51 to 53 and 61 to 63 according to the control content included in the lamp control signal.

Figure 4:
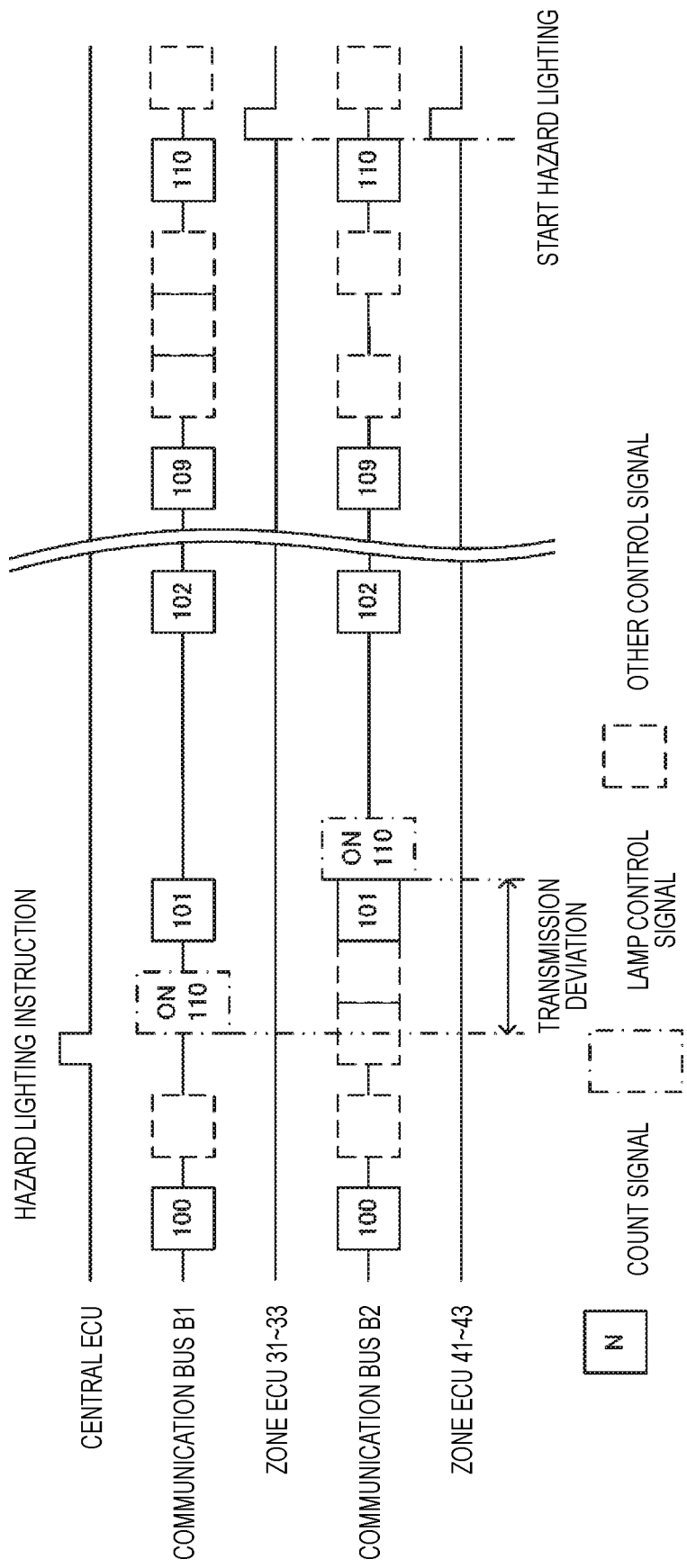
FIG. 4 is a time chart for illustrating operations of the communication system shown in FIG. 1.

Next, operations of the communication system 1 described above will be described with reference to a time chart of FIG. 4. As shown in FIG. 4, the central ECU 2 periodically transmits the count signals to the communication buses B1, B2. Since the count signal has the ID having the highest priority, the count signals can be transmitted to the communication buses B1, B2 with the highest priority. For this reason, as shown in FIG. 4, the count signals have almost no transmission deviation between the communication buses B1, B2.

When the central ECU 2 determines that a hazard lighting instruction is given by a driver, the central ECU 2 transmits the lamp control signals to the communication buses B1, B2. In the example shown in FIG. 4, since the communication bus B1 is not in use, the central ECU 2 can immediately transmit the lamp control signal to the communication bus B1. Meanwhile, since another control signal is transmitted in the communication bus B2, the central ECU 2 waits until the transmission of the corresponding another control signal is completed and transmits the lamp control signal. Thereafter, in the example shown in FIG. 4, since the control signal of which an ID has a higher transmission priority than that of the lamp control signal is simultaneously transmitted, the central ECU 2 can transmit the lamp control signal by waiting further until the transmission of the control signal is completed. Therefore, a large transmission deviation of the lamp control signals occurs between the communication buses B1, B2.

However, 110 is written as the start count value in the lamp control signal. Therefore, after receiving the count signals in which "110" is written as the count value, the zone ECUs 31 to 33 and 41 to 43 turn on the lamps 51 to 53 and 61 to 63 according to the control content included in the lamp control signals. In this manner, the count signals have almost no transmission deviation between the communication buses B1, B2. Therefore, it is possible to prevent a variation in a lighting start timing between the lamps 51 to 53 disposed in the left and the lamps 61 to 63 disposed in the right.

The present invention is not limited to the above-described embodiment, and modifications, improvements, and the like can be made as appropriate. In addition, materials, shapes, dimensions, numbers, arrangement locations, and the like of elements in the above-described embodiment are optional and not limited as long as the object of the present invention can be achieved.

In the above-described embodiment, the ID of the count signal is set to the ID having the highest priority, but the present invention is not limited thereto. The ID of the count signal may have a higher transmission priority than that of the ID of the lamp control signal. The higher the transmission priority of the ID is, the smaller the transmission deviation to the communication buses B1, B2 is. Therefore, when the ID of the count signal is given the highest priority as in the above-described embodiment, it is possible to most prevent the variation in the lighting timing of the lamps 51 to 53 and 61 to 63. However, even when the ID is not given the highest priority, if the transmission priority is higher than that of the ID of the lamp control signal, it is possible to prevent the variation in the lighting timing of the lamps 51 to 53 and 61 to 63.

In the above-described embodiment, the communication system 1 includes the two communication buses B1, B2, but the present invention is not limited thereto. The communication system 1 may include three or more communication buses B1, B2.

In the above-described embodiment, the zone ECUs 31 to 33 and 41 to 43 control the lamps 51 to 53 and 61 to 63, but the present invention is not limited thereto. The electrical devices connected to the zone ECUs 31 to 33 and 41 to 43 may be front and rear brake actuators or the like.

Here, characteristics of the embodiment of the communication system, the superior control device, and the subordinate control device according to the present invention described above will be briefly summarized and listed in [1] to [5] below.

[1] A communication system (1) includes:
  a superior control device (2);
  a first subordinate control device (31 to 34) capable of communicating with the superior control device (2) via a first bus (B1); and
  a second subordinate control device (41 to 44) capable of communicating with the superior control device (2) via a second bus (B2).
  The superior control device (2) includes:
  a first transmission unit (2) that periodically transmits a count signal including a count value counted up every time the count signal is transmitted to the first bus (B1) and the second bus (B2); and a second transmission unit (2) that transmits a control signal including a start count value and control content to the first bus (B1) and the second bus (B2).

A transmission priority of the count signal is set to be higher than a transmission priority of the control signal.

The first subordinate control device (31 to 34) and the second subordinate control device (41 to 44) include:

a first reception unit (31 to 34, 41 to 44) that receives the count signal; and a second reception unit (31 to 34, 41 to 44) that receives the control signal.

After the control signal is received, when the count value included in the received count signal becomes equal to the start count value included in the control signal, an operation corresponding to the control content included in the control signal is started.

[2] In the communication system (1) according to [1], the superior control device (2) causes the count signal to be transmitted to the first bus (B1) and the second bus (B2) with a highest priority.

[3] In the communication system (1) according to [1] or [2], the superior control device (2) cause the control signal to include the start count value having a shorter difference from the count value included in the count signal transmitted immediately before as the transmission priority of the control signal is higher, and transmits the control signal.

[4] A superior control device (2) capable of communicating with a first subordinate control device (31 to 34) via a first bus (B1) and capable of communicating with a second subordinate control device (41 to 44) via a second bus (B2), the superior control device (2) includes:

a first transmission unit (2) that periodically transmits a count signal including a count value counted up every time the count signal is transmitted to the first bus (B1) and the second bus (B2); and a second transmission unit (2) that transmits a control signal including a start count value and control content to the first bus (B1) and the second bus (B2).

A transmission priority of the count signal is set to be higher than a transmission priority of the control signal.

[5] A subordinate control device (31 to 34, 41 to 44) capable of communicating with a superior control device (2), the subordinate control device (31 to 34, 41 to 44) includes:

a first reception unit (31 to 34, 41 to 44) that receives a count signal including a count value counted up every time the count signal is transmitted from the superior control device (2); and a second reception unit (31 to 34, 41 to 44) that receives a control signal including a start count value and control content transmitted from the superior control device (2).

After the control signal is received, when the count value included in the received count signal becomes equal to the start count value included in the control signal, an operation corresponding to the control content included in the control signal is started.

According to the communication system having the configuration of [1], when the count value of the count signal having the high transmission priority becomes the start count value included in the control signal, the first and second subordinate control devices start the operation according to the control content included in the control signal. Accordingly, it is possible to prevent a variation in an operation start timing between the first and second subordinate control devices.

According to the communication system having the configuration of [2], the superior control device causes the count signal to be transmitted to the first bus and the second bus with the highest priority. Accordingly, it is possible to further prevent the variation in the operation start timing between the first and second subordinate control devices.

According to the communication system having the configuration of [3], the control content included in the control signal having the transmission priority can be quickly executed.

According to the superior control device having the configuration of [4], the count signal including the count value counted up every time the count signal is transmitted is periodically transmitted to the first and second buses, and the control signal including the start count value and the control content is transmitted to the first and second buses. Accordingly, when the count value of the count signal becomes the start count value included in the control signal, the subordinate control devices connected to the first and second buses can start the operation according to the control content included in the control signal. Accordingly, it is possible to prevent a variation in an operation start timing between the first and second subordinate control devices.

According to the subordinate control device having the configuration of [5], after the control signal is received, when the count value included in the received count signal becomes equal to the start count value included in the control signal, the operation corresponding to the control content included in the control signal is started. As a result, it is possible to prevent the variation in the operation start timing between the subordinate control devices connected to the different buses.

According to the present invention, it is possible to provide a communication system capable of preventing a variation in an operation start timing between subordinate control devices to which different buses are connected, a superior control device, and a subordinate control device.

What is claimed is:

1. A communication system comprising:
    a superior control device;
    a first subordinate control device capable of communicating with the superior control device via a first bus; and
    a second subordinate control device capable of communicating with the superior control device via a second bus,
    wherein the superior control device includes
        a first transmission unit configured to periodically transmit, to the first bus and the second bus, a count signal including a count value counted up every time the count signal is transmitted, and
        a second transmission unit configured to transmit a control signal including a start count value and control content to the first bus and the second bus,
    wherein a transmission priority of the count signal is set to be higher than a transmission priority of the control signal,
    wherein the first subordinate control device and the second subordinate control device include a first reception unit configured to receive the count signal, and a second reception unit configured to receive the control signal, and
    wherein after the control signal is received, when the count value included in the received count signal becomes equal to the start count value included in the control signal, an operation corresponding to the control content included in the control signal is started.

2. The communication system according to claim 1, wherein the superior control device causes the count signal to be transmitted to the first bus and the second bus with a highest priority.

3. The communication system according to claim 1, wherein the superior control device causes the control signal to include the start count value having a shorter difference from the count value included in the count signal transmitted immediately before as the transmission priority of the control signal is higher, and transmits the control signal.

4. A superior control device capable of communicating with a first subordinate control device via a first bus and capable of communicating with a second subordinate control device via a second bus, the superior control device comprising:

- a first transmission unit configured to periodically transmit, to the first bus and the second bus, a count signal including a count value counted up every time the count signal is transmitted; and
- a second transmission unit configured to transmit a control signal including a start count value and control content to the first bus and the second bus, wherein a transmission priority of the count signal is set to be higher than a transmission priority of the control signal.

5. A subordinate control device capable of communicating with a superior control device, the subordinate control device comprising:

- a first reception unit configured to receive a count signal including a count value counted up every time the count signal is transmitted from the superior control device; and
- a second reception unit configured to receive a control signal including a start count value and control content transmitted from the superior control device, wherein after the control signal is received, when the count value included in the received count signal becomes equal to the start count value included in the control signal, an operation corresponding to the control content included in the control signal is started.

* * * * *